(12) United States Patent
Swayne et al.

(10) Patent No.: US 10,976,767 B2
(45) Date of Patent: Apr. 13, 2021

(54) SAFETY CONTROL LOCKOUT KNOB

(71) Applicant: Electrolux Home Products, Inc., Charlotte, NC (US)

(72) Inventors: Steven Swayne, Nashville, TN (US); Desirea Lewis, Clarksville, TN (US); Andrew Worley, Springfield, TN (US); Brendan McGinnis, Russellville, KY (US)

(73) Assignee: Electrolux Home Products, Inc., Charlotte, NC (US)

(*) Notice: Subject to any disclaimer, the term of this patent is extended or adjusted under 35 U.S.C. 154(b) by 0 days.

(21) Appl. No.: 16/595,403

(22) Filed: Oct. 7, 2019

(65) Prior Publication Data

US 2020/0033905 A1 Jan. 30, 2020

Related U.S. Application Data

(62) Division of application No. 16/137,704, filed on Sep. 21, 2018, now Pat. No. 10,437,278, which is a
(Continued)

(51) Int. Cl.
*G05G 1/10* (2006.01)
*G05G 5/06* (2006.01)
(Continued)

(52) U.S. Cl.
CPC .............. *G05G 5/06* (2013.01); *F16K 35/025* (2013.01); *G05G 1/08* (2013.01); *G05G 1/082* (2013.01);
(Continued)

(58) Field of Classification Search
CPC ............ G05G 1/08; G05G 1/082; G05G 1/10; G05G 1/12; G05G 5/005; G05G 5/02;
(Continued)

(56) References Cited

U.S. PATENT DOCUMENTS 488,737 A * 12/1892 Lawrence ............. F16K 35/025
251/109
644,854 A * 3/1900 Florimont ............. F16K 35/025
251/109
(Continued)

FOREIGN PATENT DOCUMENTS

DE 822383 C * 11/1951 ........... F16K 35/025
DE 2902822 7/1980
(Continued)

OTHER PUBLICATIONS

Machine translation of DE 822383 C obtained on Apr. 14, 2020.*
(Continued)

*Primary Examiner* — Adam D Rogers
(74) *Attorney, Agent, or Firm* — Pearne & Gordon LLP

(57) ABSTRACT

A control knob for controlling the operation of a component of a household appliance is disclosed. The control knob includes a body configured to be attached to a rotatable rod extending from the appliance. A locking element reversibly secures the body in at least one rotational position. The locking element is movable between a first position and a second position. The locking element is configured to engage with a notch to rotatably secure the body in the at least one rotational position when the locking element is in the first position, and to disengage from the notch to permit the body to be rotated when the locking element is in the second position.

16 Claims, 10 Drawing Sheets

Related U.S. Application Data division of application No. 15/044,072, filed on Feb. 15, 2016, now Pat. No. 10,114,405.

(51) Int. Cl.
  *F16K 35/02* (2006.01)
  *G05G 1/08* (2006.01)
  *G05G 5/00* (2006.01)
  *F24C 3/12* (2006.01)
  *F24C 7/08* (2006.01)

(52) U.S. Cl.
  CPC ............... *G05G 1/10* (2013.01); *G05G 5/005* (2013.01); *F24C 3/126* (2013.01); *F24C 7/082* (2013.01)

(58) Field of Classification Search
  CPC . G05G 5/06; G05G 5/065; G05G 5/08; F24C 3/12; F24C 3/126; F24C 7/082; B60K 235/941; H02B 1/044; F16K 35/025; H01H 3/08; H01H 3/50; H01H 19/11; H01H 19/14
  See application file for complete search history.

(56) References Cited

U.S. PATENT DOCUMENTS

| | | | | |
|---|---|---|---|---|
| 919,019 | A * | 4/1909 | Jakobson | F16K 35/025 251/109 |
| 1,018,350 | A * | 2/1912 | Bedard | F16K 35/025 251/110 |
| 1,181,315 | A * | 5/1916 | Johnson | F16K 35/025 251/109 |
| 1,188,260 | A * | 6/1916 | Flax | F16K 35/025 251/103 |
| 1,343,530 | A | 6/1920 | Tallman | |
| 1,498,817 | A | 6/1924 | Henderson | |
| 1,633,233 | A * | 6/1927 | Smith | F16K 35/025 126/42 |
| 1,671,594 | A | 5/1928 | Kohlmann | |
| 1,686,906 | A | 10/1928 | Faba | |
| 1,689,657 | A | 10/1928 | Wise | |
| 1,740,945 | A | 12/1929 | Kuehn et al. | |
| 1,743,685 | A | 1/1930 | Platt et al. | |
| 1,786,954 | A | 12/1930 | Kramer et al. | |
| 1,796,840 | A * | 3/1931 | Green | F16K 35/025 251/109 |
| 1,802,496 | A | 4/1931 | Bernhard | |
| 2,501,008 | A | 3/1950 | Schramm | |
| 2,829,538 | A | 4/1958 | Mueller | |
| 2,838,064 | A | 6/1958 | Schieberl | |
| 2,849,891 | A | 9/1958 | Mills | |
| 3,035,567 | A | 5/1962 | Reeves | |
| 3,084,681 | A | 4/1963 | Reeves | |
| 3,100,404 | A | 8/1963 | Boeddeker | |
| 3,154,051 | A | 10/1964 | Brookfield | |
| 3,176,541 | A | 4/1965 | Keeling | |
| 3,392,598 | A | 7/1968 | Waldorf | |
| 3,413,953 | A | 12/1968 | Kuhl | |
| 3,430,515 | A | 3/1969 | Lawrence | |
| 4,037,490 | A | 7/1977 | Wilson | |
| 4,267,747 | A * | 5/1981 | Wallace | B24B 55/00 251/98 |
| 4,487,089 | A | 12/1984 | Harwood | |
| 4,895,043 | A | 1/1990 | Lee | |
| 5,256,841 | A | 10/1993 | Zanella | |
| 5,363,720 | A | 11/1994 | Sanchez | |
| 5,662,465 | A | 9/1997 | Kano | |
| 5,741,003 | A | 4/1998 | Segien, Jr. | |
| 5,771,878 | A | 6/1998 | Lewis et al. | |
| 6,375,150 | B1 | 4/2002 | Aguirre-Esponda et al. | |
| 6,394,081 | B1 | 5/2002 | Aguirre-Esponda et al. | |
| 6,715,483 | B2 | 4/2004 | Erdmann | |
| 6,871,909 | B2 | 3/2005 | Hobb | |
| 7,171,728 | B2 | 2/2007 | Chirumbolo | |
| 7,285,738 | B2 | 10/2007 | Lavigne | |
| 8,092,212 | B2 | 1/2012 | Albizuri | |
| 8,434,199 | B1 | 5/2013 | Bowen et al. | |
| 8,674,246 | B2 | 3/2014 | Steffens et al. | |
| 8,967,019 | B2 | 3/2015 | O'Keefe et al. | |
| 9,182,773 | B2 | 11/2015 | Campean | |
| 9,188,408 | B2 | 11/2015 | Huynh | |
| 9,268,356 | B2 | 2/2016 | Burleson | |
| 2015/0168987 | A1 | 6/2015 | O'Keefe et al. | |
| 2015/0370283 | A1 | 12/2015 | Lawson | |
| 2017/0060170 | A1 | 3/2017 | Starr | |

FOREIGN PATENT DOCUMENTS

| | | |
|---|---|---|
| DE | 3637451 | 5/1986 |
| DE | 3637505 | 5/1988 |
| DE | 4130939 | 3/1992 |
| DE | 9408478 | 9/1994 |
| DE | 19706677 | 8/1998 |
| EP | 1316757 | 4/2003 |
| FR | 2379855 | 9/1978 |
| GB | 587709 | 1/1946 |
| GB | 2213914 | 8/1989 |
| JP | 419451 | 9/2005 |
| SE | 512237 | 2/2000 |
| WO | 2015180789 | 12/2015 |

OTHER PUBLICATIONS

International Search Report & Written Opinion issued in corresponding PCT Application No. PCT/US2017/016621 dated Sep. 25, 2017, 15 pages.

* cited by examiner

SAFETY CONTROL LOCKOUT KNOB

CROSS-REFERENCE TO RELATED APPLICATIONS

This application is a divisional of U.S. application Ser. No. 16/137,704 filed on Sep. 21, 2018, which is a divisional of U.S. application Ser. No. 15/044,072, filed on Feb. 15, 2016. Both applications are incorporated herein by reference.

FIELD OF THE INVENTION

The following description relates generally to a safety control lockout knob and, more specifically, to a cooking appliance with a safety control lockout knob for preventing accidental operation of the appliance.

BACKGROUND OF THE INVENTION

Cooktops or other appliances can include a plurality of control knobs for allowing a user to actuate a function of the cooktop or appliance, e.g., to set the temperature in an oven, to control a gas burner, electric heating element, or infrared heating element, etc. The control knobs usually are placed at a location whereby a user can easily access the control knobs during operation of the appliance. However, this convenient placement of the control knobs can allow children easy access to the control knobs. Moreover, if left unattended, individuals with dementia or Alzheimer's may access the control knobs and create an unsafe condition.

It is desirable to have a control knob with a lockout feature that is designed to prevent accidental actuation of various functions of the cooktop or other appliance.

SUMMARY OF THE INVENTION

A control knob for controlling the operation of a component of a household appliance is disclosed. The control knob comprising a body configured to be attached to a rotatable rod extending from the appliance. A locking element reversibly secures the body in at least one rotational position. The locking element is movable between a first position and a second position. The locking element is configured to engage with a notch to rotatably secure the body in the at least one rotational position when the locking element is in the first position, and to disengage from the notch to permit the body to be rotated when the locking element is in the second position.

A further control knob is disclosed. The control knob comprising a rotatable knob body having a longitudinal axis. A locking element comprises a pin portion extending therefrom. The pin portion extends through the knob body. A spring biases the locking element into a first position wherein a distal end of the pin portion extends to a forward position relative to a front end of the knob body. The pin portion is slidable against a biasing force of the spring into a second position wherein the distal end thereof is withdrawn from the forward position.

Yet another control knob is disclosed. The cooktop comprising a rotatable knob body having a longitudinal axis, and a locking element comprising at least one leg extending in a generally longitudinal direction. The at least one leg is in a first, relaxed position wherein a distal end of the at least one leg is spaced from the longitudinal axis. The at least one leg is resiliently deflectable into a second position wherein the distal end is deflected toward said longitudinal axis.

Still another control knob is disclosed. The control knob comprising a rotatable knob body having a longitudinal axis. A locking element comprises a lever portion extending therefrom. The lever portion extends in a generally longitudinal direction and is pivotable about an axis extending in a direction generally perpendicular to the longitudinal axis of the knob body. A spring biases the locking element into a first position wherein a distal end of the lever portion extends to a forward position relative to a front end of the knob body. The lever portion is pivotable against a biasing force of the spring into a second position wherein the distal end of the lever portion is withdrawn from the forward position.

BRIEF DESCRIPTION OF THE DRAWINGS

Preferred embodiments are disclosed and described in detail herein with reference to the accompanying drawings which form a part hereof, and wherein.

DETAILED DESCRIPTION OF PREFERRED EMBODIMENTS

Figure 1:
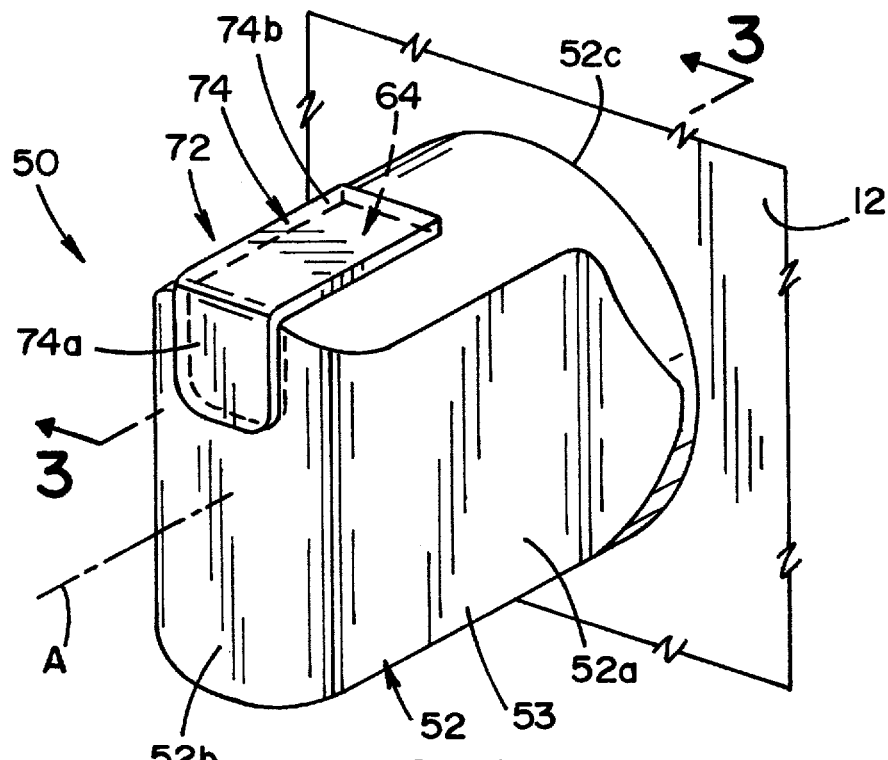
FIG. 1 is a perspective view showing a control knob in an OFF position and a locking element of the control knob in a first position, according to a first embodiment.

FIG. 1 shows a control knob 50 of a household appliance (not shown), e.g., a cooktop. The household appliance may include a plurality of control knobs 50. For the purposes of the present application, only one control knob 50 will be described in detail.

The control knob 50 is mounted to a panel 12 of the appliance. The control knob 50 is provided for allowing a user to control a component or a function of the household appliance, e.g., adjust the temperature in an oven, control a gas burner, electric element, infrared heater, etc.

Figure 5:
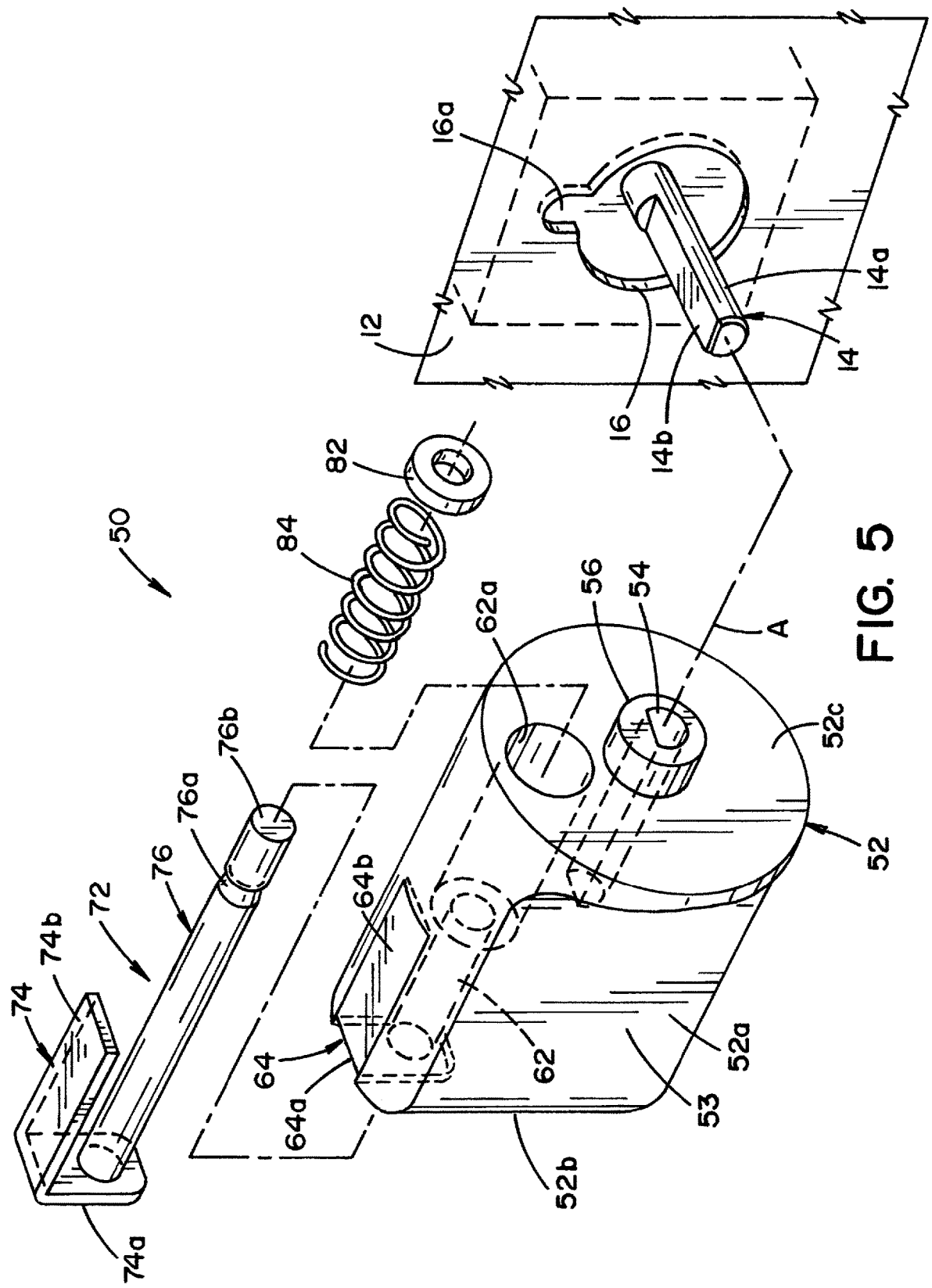
FIG. 5 is an exploded view of the first embodiment shown in FIG. 1.

As best seen in FIG. 5, a rotatable rod 14 extends through an opening 16 formed in the panel 12. The rod 14 is connected to a component of the appliance wherein rotation of the rod 14 controls the operation of the component. For example, the rod 14 can be a valve stem (as for a gas burner) or the stem of a potentiometer (as for controlling an electric burner or heating element). In a further alternative it can be linked to a cam element to actuate a conventional bimetal switch (not shown). In the illustrated embodiment a distal portion 14a of the rod 14 is notched to define a flat surface 14b. In the embodiment shown, the distal portion 14a has a generally "D-shaped" cross section but other cross sectional shapes are contemplated as also being acceptable. As understood by those skilled in the art, the rod 14 is made of a conventional material, including but not limited to, steel and aluminum.

In the embodiment shown, the opening 16 is generally circular in shape. A portion of the panel 12 is contoured to define a notch 16a. The notch 16a is positioned and dimensioned as described in detail below.

Referring now to FIGS. 1-5, the control knob 50 is shown. The control knob 50 has a front end oriented toward a user and a rear end oriented toward the appliance. In general, the control knob 50 includes a body 52 and a locking element 72. The body 52 is generally cylindrical in shape with a longitudinal axis "A" and includes a contoured grip 52a, a front face 52b and a rear face 52c. Grip 52a is contoured in a customary manner (having opposing side flats 53) to allow for easy gripping by a user. The body 52 is made of a conventional material, including but not limited to, plastic and aluminum.

A boss 56 extends from the rear face 52c of the body 52. An opening 54, best seen in FIG. 5, extends through the boss 56 and into the body 52. Both the opening 54 and the boss 56 are axially aligned with the longitudinal axis "A." The opening 54 extends a predetermined distance into the body 52. In the embodiment shown, the opening 54 is "D-shaped" to correspond to the cross sectional shape of the distal portion 14a of the rod 14, which is received within the opening 54 and retained therein via an interference fit.

A counter-bored, through hole 62 extends from the rear face 52c to the front face 52b of the body 52. The hole 62 includes a counter-bored portion 62a that communicates with the rear face 52c. The hole 62 is offset from the longitudinal axis "A" and extends in a direction generally parallel to the longitudinal axis "A."

Figure 3:
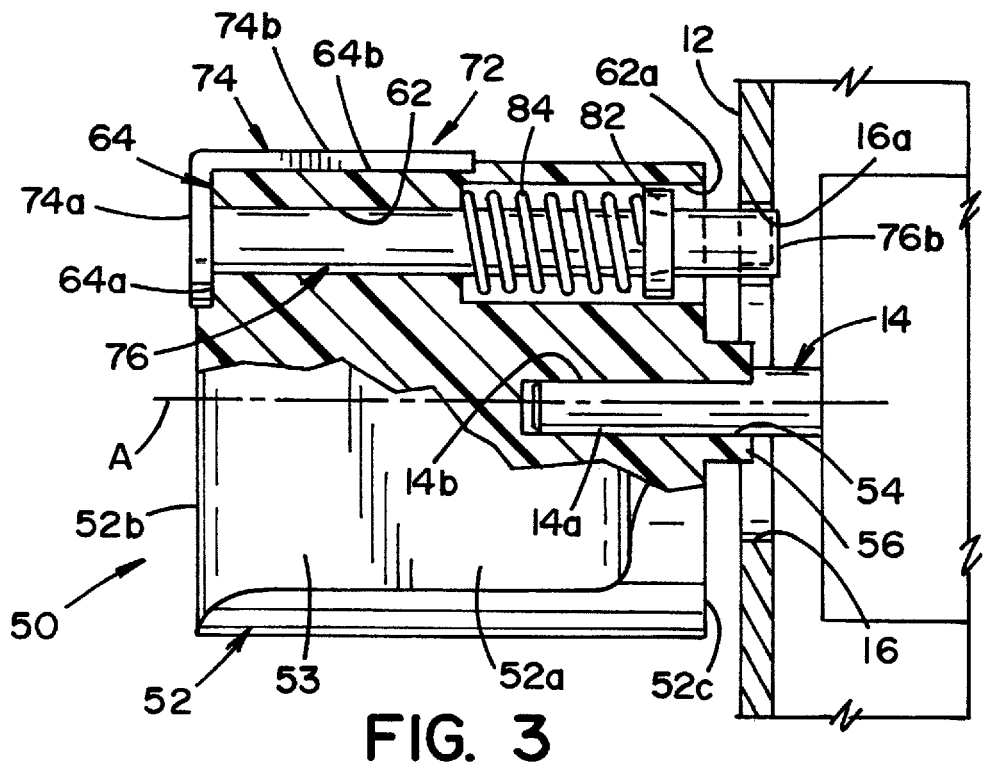
FIG. 3 is a sectional view of the first embodiment shown in FIG. 1 taken along line 3-3.
Figure 4:
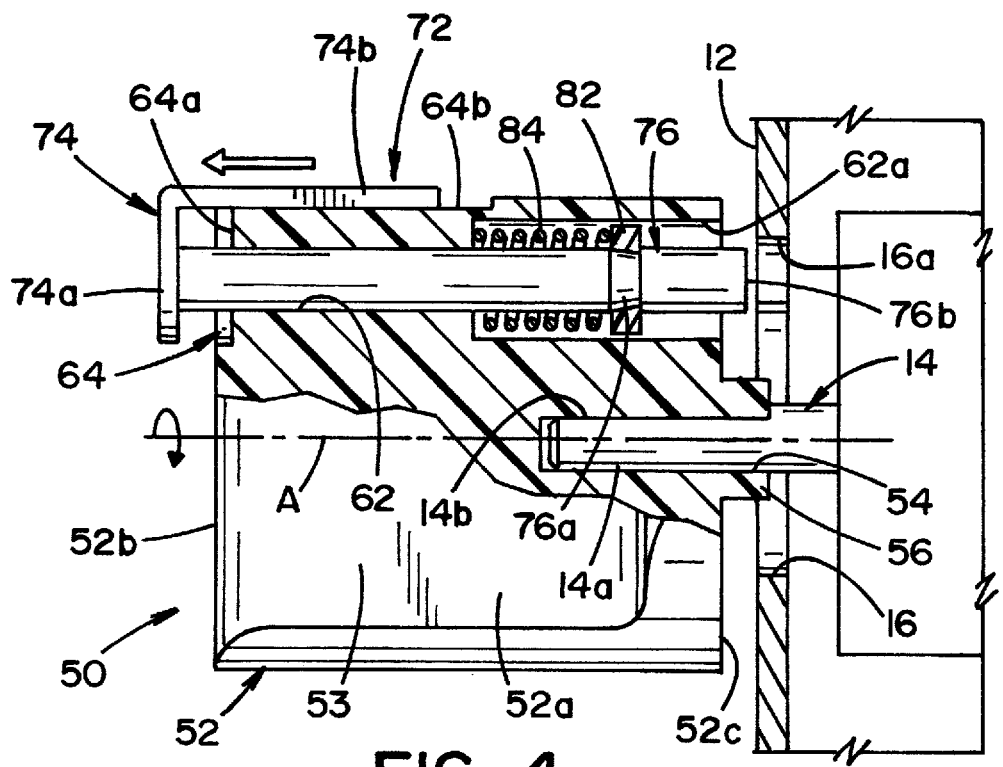
FIG. 4 is a sectional view of the first embodiment shown in FIG. 2 taken along line 4-4.

An L-shaped recess 64 is formed in the body 52 when viewed in side cross-section as in FIGS. 3-4. A first portion 64a of the recess 64 is formed in the front face 52b and a second portion 64b of the recess 64 is formed in an outer cylindrical surface of grip 52a; preferably in an upper portion of that surface disposed between the opposing side flats 53 where a user would typically grasp the knob 50. The first portion 64a of the recess 64 is positioned such that the hole 62 exits the body 52 at the first portion 64a. The recess 64 is dimensioned to receive a portion of the locking element 72.

Referring now to FIG. 5, locking element 72 is best seen. Locking element 72 includes a gripper portion 74 and a pin portion 76. Gripper portion 74 is a generally L-shaped element that includes a base 74a and a leg 74b. The base 74a is attached to one distal end of the pin portion 76. The leg 74b extends from an end of the base 74a in a direction generally aligned with a longitudinal axis of the pin portion 76. The base 74a and the leg 74b are dimensioned to be received and normally seated into the first portion 64a and the second portion 64b of recess 64, respectively, when the locking element 72 is engaged to prevent rotation of the knob 50 (explained below).

The pin portion 76 of the locking element 72 is rod-shaped element having a distal end 76b. The pin portion 76 is dimensioned to slide within the counter-bored, through hole 62. An annular groove 76a (FIG. 4) is formed near the distal end 76b of the pin portion 76. The annular groove 76a is dimensioned to receive and retain a locking washer 82, therein.

A biasing element 84 is provided for biasing the locking element 72 in a predetermined, locked position. In the embodiment shown, the biasing element 84 is a conventional compression spring having a predetermined spring constant.

As best seen in FIG. 5, the control knob 50 is assembled by inserting the pin portion 76 of the locking element 72 into the countered-bored through hole 62. In particular, the pin portion 76 is inserted through the hole 62 from the front face 52b of the body 52. When fully inserted into the hole 62, the gripper portion 74 of the locking element 72 is seated within the recess 64 of the body 52, with its distal end 76b extending past the rear face 52c of the body 52.

The biasing element 84 is placed into the counter-bored portion 62a of the hole 62 from the rear face 52c of the body 52. Thereafter, the locking washer 82 is positioned in the annular groove 76a of the locking element 72 to retain the biasing element 84 between the locking washer 82 and a bottom of the counter-bored portion 62a. In particular, the biasing element 84 applies a force to the locking washer 82 to bias the gripper portion 74 of the locking element 72 into the L-shaped recess 64 and to bias the distal end 76b of the pin portion 76 a predetermined distance past the rear face 52c of the body 52, as shown in FIG. 1 and FIG. 3. It is also contemplated that the biasing element 84 may bias the distal end 76b of the pin portion 76 a predetermined distance from the front end of the control knob 50 such that the distal end 76b may or may not extend past the rear face 52c of the body 52.

Figure 2:
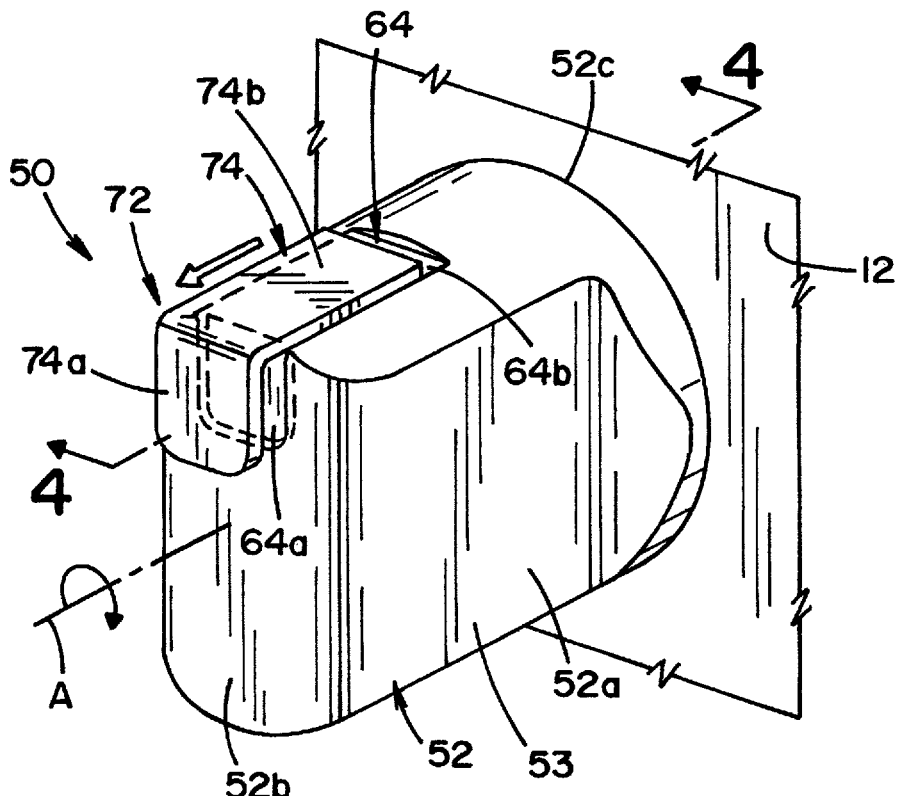
FIG. 2 is a perspective view of the first embodiment shown in FIG. 1, showing the locking element in a second position.

The locking element 72 is moveable between a first, forward position, shown in FIGS. 1 and 3 and a second, retracted position, shown in FIGS. 2 and 4. When the locking element 72 is in the first position, the base 74a and the leg 74b of the gripper portion 74 are disposed in the first portion 64a and the second portion 64b of recess 64, respectively, and the distal end 76b of the pin portion 76 of the locking element 72 extends past the rear face 52c of body 52. When the locking element 72 is in the second position, the base 74a of the gripper portion 74 is spaced from the first portion 64a of the recess 64 and the distance between the distal end 76b and the rear face 52c is reduced as compared to when the locking element 72 is in the first position. Alternatively, the distal end 76b of the pin portion 76 can be withdrawn within the counter-bored portion 62a of the hole 62 in the second position.

Referring again to FIG. 5, the attachment of the control knob 50 to the distal portion 14a of the rod 14 on the panel 12 is shown. As noted above, the front end of the control knob 50 is oriented toward a user and the rear end of control knob 50 is oriented toward the appliance. In particular, the opening 54 of the body 52 is dimensioned to receive the distal portion 14a of the rod 14. It is contemplated that other attachment means, such as, but not limited to, screws, set screws, threads, interference fits, knurled surfaces, etc., may be used alone or in combination to secure the control knob 50 to the rod 14. It is also contemplated that the rear end of the control knob 50 may extend into or through the opening 16 in the panel 12.

The control knob 50 will now be described with reference to the operation of the control knob 50. Referring to now FIGS. 1 and 3, the control knob 50 is shown in a first rotational position, hereinafter referred to as an OFF position. In this position, the distal end 76b of the pin portion 76 aligns with and extends into a hole, recess or notch 16a in the panel 12. (In this application the term "notch" shall refer collectively to any such hole, recess, notch or other opening in a panel or surface on an appliance with which a locking element or portion thereof, as herein described, engages to inhibit rotation of a knob). The pin portion 76 thereby locks the control knob 50 in the OFF position and prevents a user from rotating the control knob 50 to another position. In the embodiment shown in FIG. 5, the notch 16a is generally curved to correspond closely to the outer surface of the distal end 76b of the pin portion 76. It is contemplated that providing a separate hole or recess (not shown) in the panel 12 for receiving the distal end 76b would also be acceptable.

To turn the control knob 50 to another position other than the OFF position, a user first pulls on the locking element 72 thereby causing the distal end 76b of the pin portion 76 to withdraw from the notch 16a. FIGS. 2 and 4 show the locking element 72 in the second position. Once the distal end 76b of the pin portion 76 is withdrawn from the notch 16a, the user may rotate the control knob 50 to a desired position to control the operation of the related component.

The biasing element 84 continues to bias the locking element 72 toward panel 12 such that the distal end 76b of the pin portion 76 slides along the surface of the panel 12 along a circular arc as the knob body 52 is rotated. Once the body 52 is rotated back to the OFF position, the locking element 72 realigns with the notch 16a and the biasing element 84 forces the distal end 76b of the pin portion 76 into the notch 16a, i.e., back into the first position of the pin portion 76. As such, the control knob 50 is re-secured or locked back into the OFF position.

Referring now to FIGS. 6-10, a second control knob 150 is shown. The control knob 150 has a front end oriented toward a user and a second end oriented toward the appliance. The control knob 150 includes a body 152 and a locking element 162. The body 152 is generally cylindrical in shape and includes a contoured grip 152a, a front face 152b and a rear face 152c similarly as the preceding embodiment. The grip 152a is contoured in a customary manner (having opposing side flats 153) to allow for easy gripping by a user. The body 152 is made of a conventional material, including but not limited to, plastic and aluminum. A longitudinal axis "B" extends through the body 152.

Figure 10:
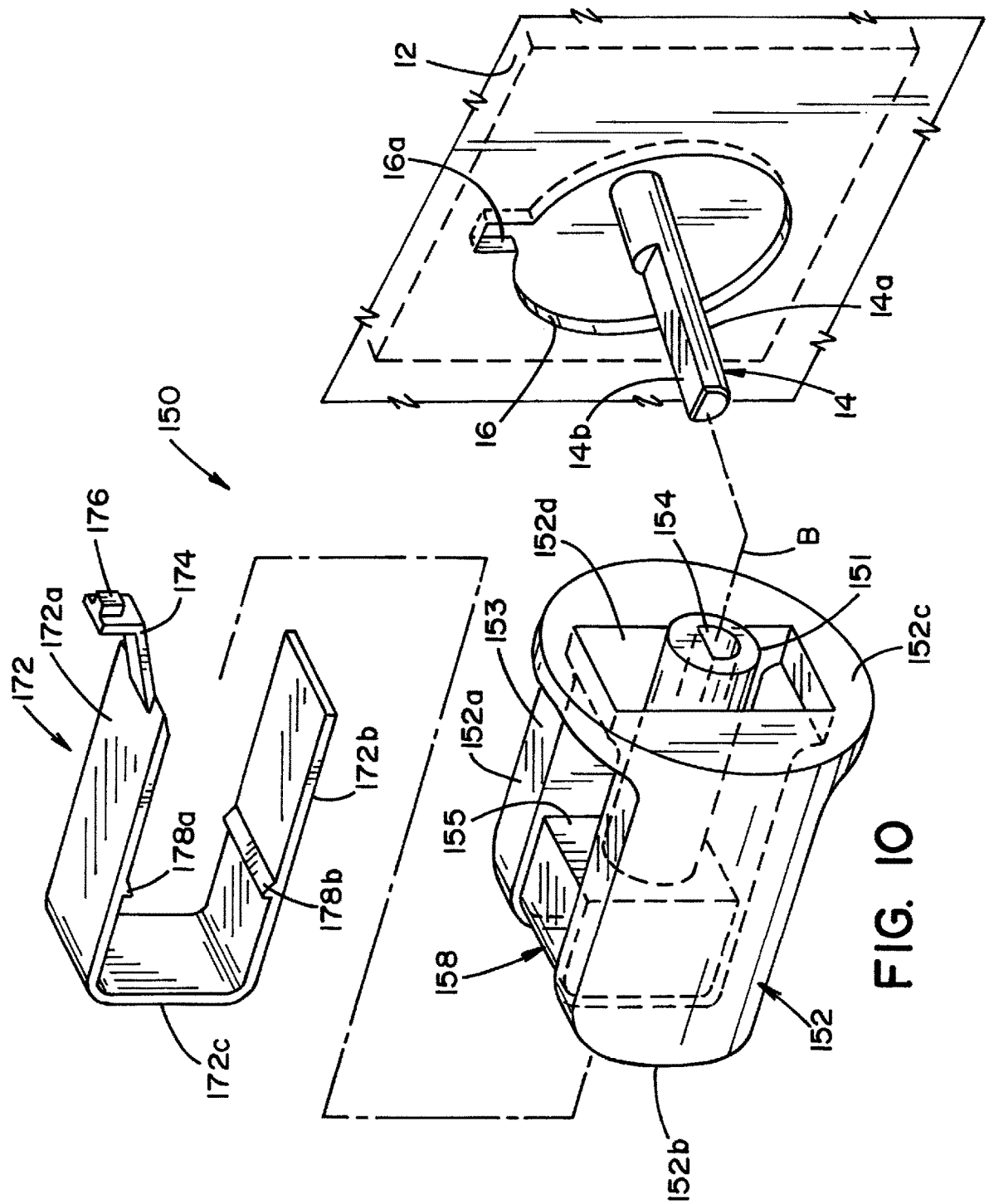
FIG. 10 is an exploded view of the second embodiment shown in FIG. 6.

An opening 152d, best seen in FIG. 10, extends into the rear face 152c of the body 152 a predetermined distance. The opening 152d is axially aligned with the longitudinal axis "B." In the embodiment shown, the opening 152d has a generally rectangular cross-section when viewed along axis B, and extends longitudinally into the body 152 from its rear face 152c until reaching surface 155. In the illustrated embodiment, lateral portions of the opening 152d are open to the outside such that corresponding side openings (communicating with the opening 152d) are provided in the opposing side flats 153 of the grip portion 152a of the knob body 152.

An elongated boss 151 extends longitudinally from the surface 155 defined by opening 152d. The elongated boss 151 is generally circular in cross section and extends past the rear face 152c of the body 152. The boss 151 is axially aligned with the longitudinal axis "B." An opening 154 extends into the boss 151 from its distal end. The opening 154 is axially aligned with the longitudinal axis "B." In the embodiment shown, the opening 154 is "D-shaped" to correspond to the shape of the distal portion 14a of rod 14.

A recess 158 is formed in the opposing side flats 153 and the front face 152b of the body 152. The recess 158 is generally U-shaped when viewed in side cross-section as in FIGS. 8 and 9, and is dimensioned to seat the locking element 172.

The locking element 172 is a generally U-shaped element having a first leg 172a, a second leg 172b and a base 172c. An angled, substantially L-shaped tab 174 extends outwardly (radially) from a distal end of the first leg 172a. A stop 176 is formed at and extends from a distal end of the outer leg of tab 174. Raised locking tabs 178a, 178b are formed on an inner surface of the first leg 172a and the second leg 172b, respectively. The tabs 178a, 178b extend laterally along each of the first leg 172a and the second leg 172b, respectively, preferably across their full width from one lateral edge thereof to an opposite edge. In the embodiment shown, the tabs 178a, 178b are triangular in shape.

Figure 8:
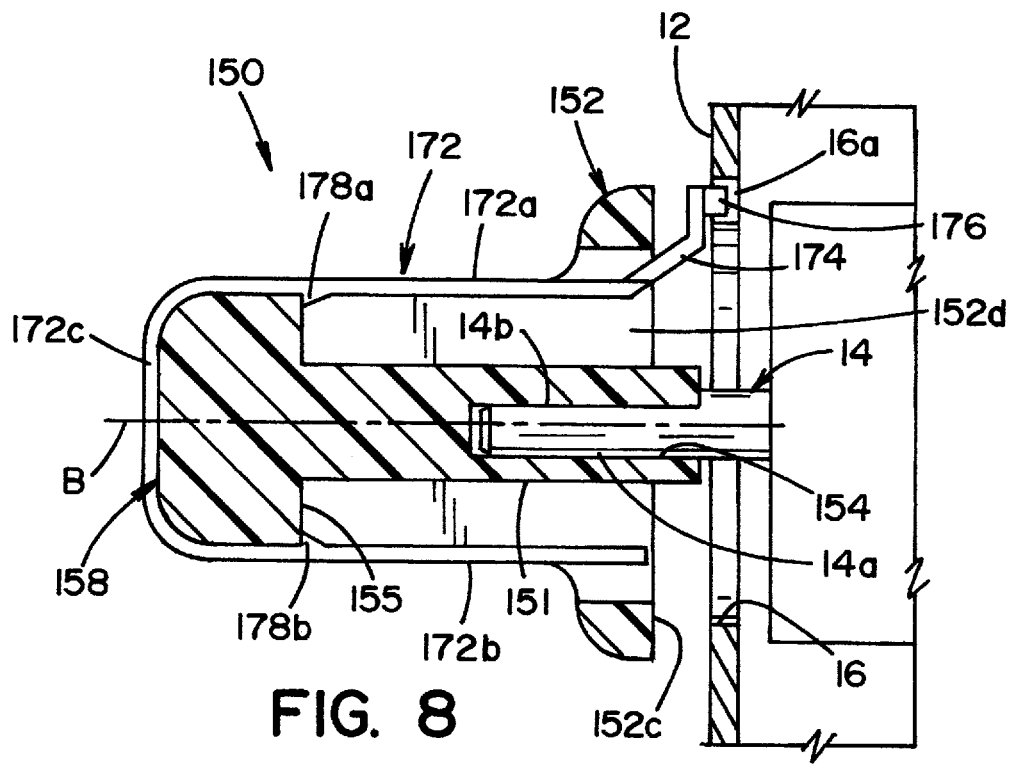
FIG. 8 is a sectional view of the second embodiment shown in FIG. 6 taken along line 8-8.

The control knob 150 is assembly by placing the locking element 172 on the body 152. In particular, the first leg 172a is disposed in a portion of the recess 158 disposed on one side (e.g., at one of opposing flats 153) of the body 152. The second leg 172b is disposed in a portion of the recess 158 disposed on an opposite side (e.g., at the other opposing flat 153) of the body 152. The base 172c is disposed in a portion of the recess 158 at the front face 152b of the body 152. As shown in FIG. 8, the distal ends of the first leg 172a and the second leg 172b extend over the lateral portions of the opening 152d formed in the body 152 along the side openings in the opposing flats 153 of the grip portion 152 as described above. Accordingly, the first and second legs 172a and 172b substantially bound the opening 152d when installed on the body 152.

The locking tabs 178a, 178b of the locking element 172 are disposed to mate with the surface 155. In this respect, the tabs 178a, 178b define a "snap-fit" connection for securing the locking element 172 to the body 152 as the locking element 172 is advanced longitudinally over the body 152 toward the rear face 152c.

Figure 6:
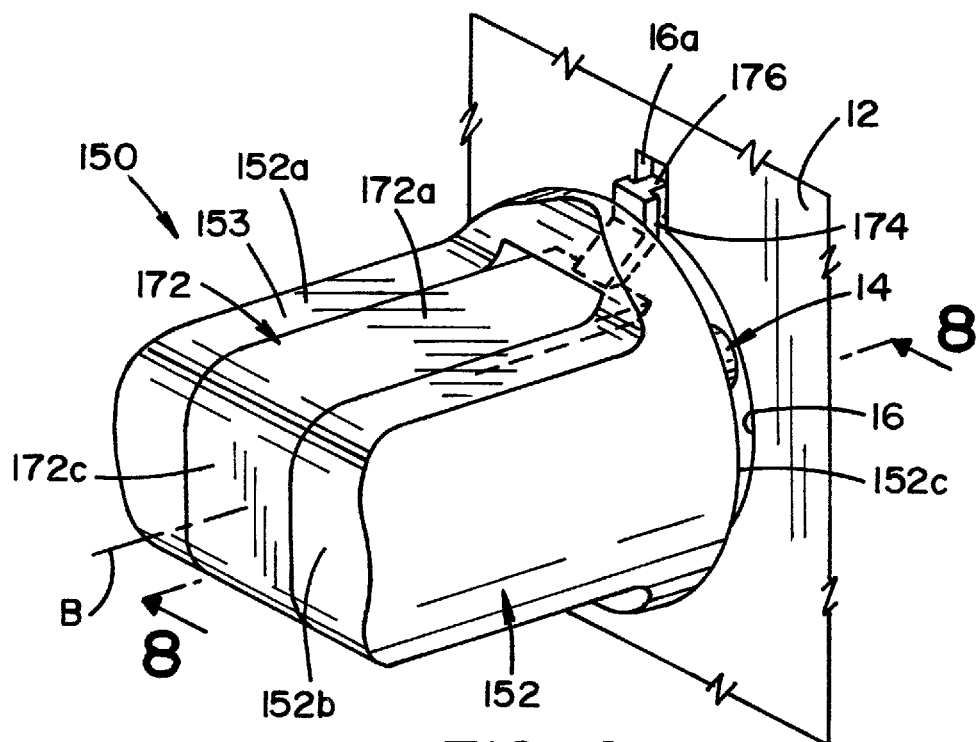
FIG. 6 is a perspective view showing a control knob in an OFF position and a locking element of the control knob in a first position, according to a second embodiment.
Figure 7:
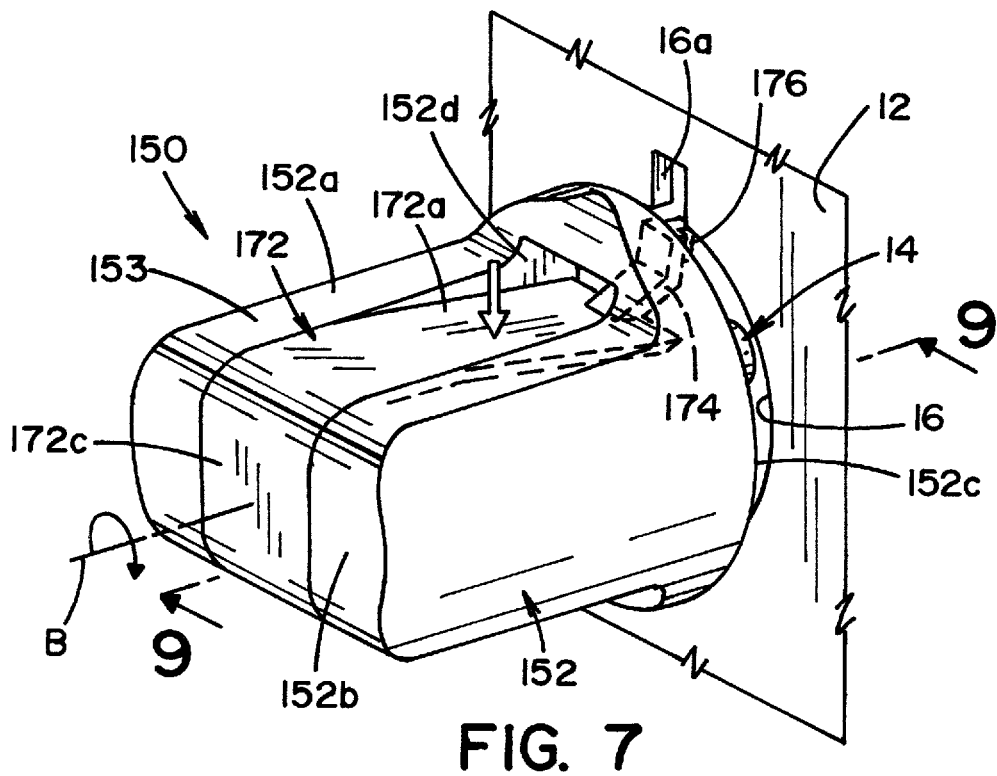
FIG. 7 is a perspective view of the second embodiment shown in FIG. 6, showing the locking element in a second position.
Figure 9:
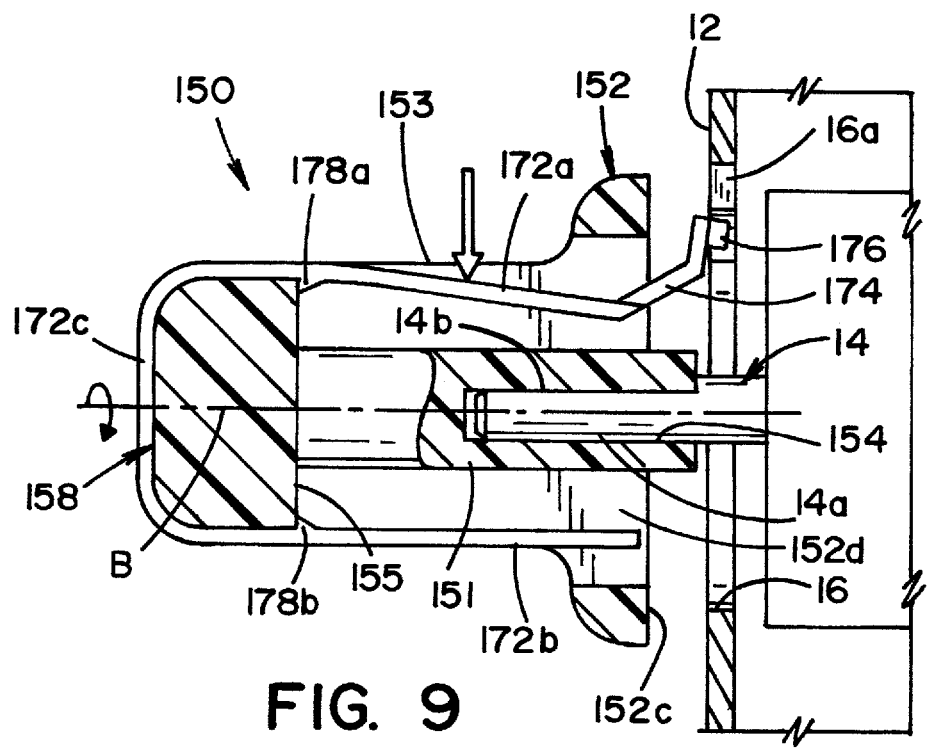
FIG. 9 is a sectional view of the second embodiment shown in FIG. 7 taken along line 9-9.

The locking element 172 is moveable between a first, relaxed position, shown in FIGS. 6 and 8 and a second, deflected position, shown in FIGS. 7 and 9. When the locking element 172 is in the first position, the first leg 172a and the second leg 172b are in a relaxed condition and are spaced apart from one another, preferably extending in generally parallel planes. As shown in FIGS. 7 and 9, when the locking element is in the first position, the distal end of the first leg 172a is a first radial distance from the longitudinal axis "B." When the locking element 172 is in the second position, at least the first leg 172a is elastically deflected inward, toward the second leg 172b, at its distal end against the modulus of the material. The stop 176 thereon correspondingly is deflected radially inward toward the longitudinal axis "B." In other words, when the locking element 172 is in the second position, the distal end of the first leg 172a is a second radial distance from the longitudinal axis "B," wherein the second radial distance is smaller than the first radial distance.

Referring again to FIG. 10, the attachment of the control knob 150 to the distal portion 14a of the rod 14 on the panel 12 is shown. As noted above, the front end of the control knob 150 is oriented toward a user and the rear end of the control knob 150 is oriented toward the appliance. In particular, the opening 154 of the body 152 is dimensioned to receive the distal portion 14a of the rod 14. It is contemplated that other attachment means, such as, but not limited to, screws, set screws, threads, interference fits, knurled surfaces, etc., may be used alone or in combination to secure control knob 150 to rod 14. It is also contemplated that the rear end of the control knob 150 may extend into or through the opening 16 in the panel 12.

The control knob 150 will now be described with reference to the operation of the control knob 150. In FIGS. 6 and 8 the control knob 150 is shown in a first rotational position, hereinafter referred to as an OFF position. When the control knob 150 is in the OFF position, the locking element 172 is in the first position such that the stop 176 extends radially into the notch 16a in the panel 12. To turn the control knob 150 to another position other than the OFF position, a user first moves the locking element 172 to the second position by at least depressing the first leg 172a radially inward. As the first leg 172a deflects toward longitudinal axis "B," the stop 176 is withdrawn radially out of the notch 16a, as shown in FIGS. 7 and 9, thus removing it as an impediment to rotation of the knob 150. Once the stop 176 is withdrawn, the user may rotate the control knob 150 to a desired position to control the operation of the related component.

The locking element 172 is made from an elastic material, such as, but not limited to, plastic or metal, such that the deflection of the first leg 172a radially toward the longitudinal axis "B" is resisted based on the modulus of the material by a force that tends to return the first leg 172a to its resting condition (i.e. to its first position). This force biases the stop 176 on the first leg 172a in a radially outward direction toward the cylindrical surface that defines the opening 16 in the panel 12. In particular, the stop 176 on the first leg 172a is positioned and dimensioned to slide along the cylindrical surface that defines the opening 16. Once the body 152 is rotated back to the OFF position, the stop 176 realigns with the notch 16a and is forced into the notch 16a, i.e., back into the first position. As such, the control knob 150 is re-secured or locked back into the OFF position.

Referring now to FIGS. 11-15, a third control knob 250 is shown. The control knob 250 includes a front end oriented toward a user and a second end oriented toward the appliance. In general, the control knob 250 includes a body 252 and a locking element 272. The body 252 is generally cylindrical in shape and includes a contoured grip 252a, a front face 252b and a rear face 252c. Grip 252a is contoured in a customary manner (having opposing side flats 253) to allow for easy gripping by a user. The body 252 is made of a conventional material, including but not limited to, plastic and aluminum. A longitudinal axis "C" extends through the body 252. The control knob 250 includes a front end facing a user and a rear end facing the appliance.

Figure 15:
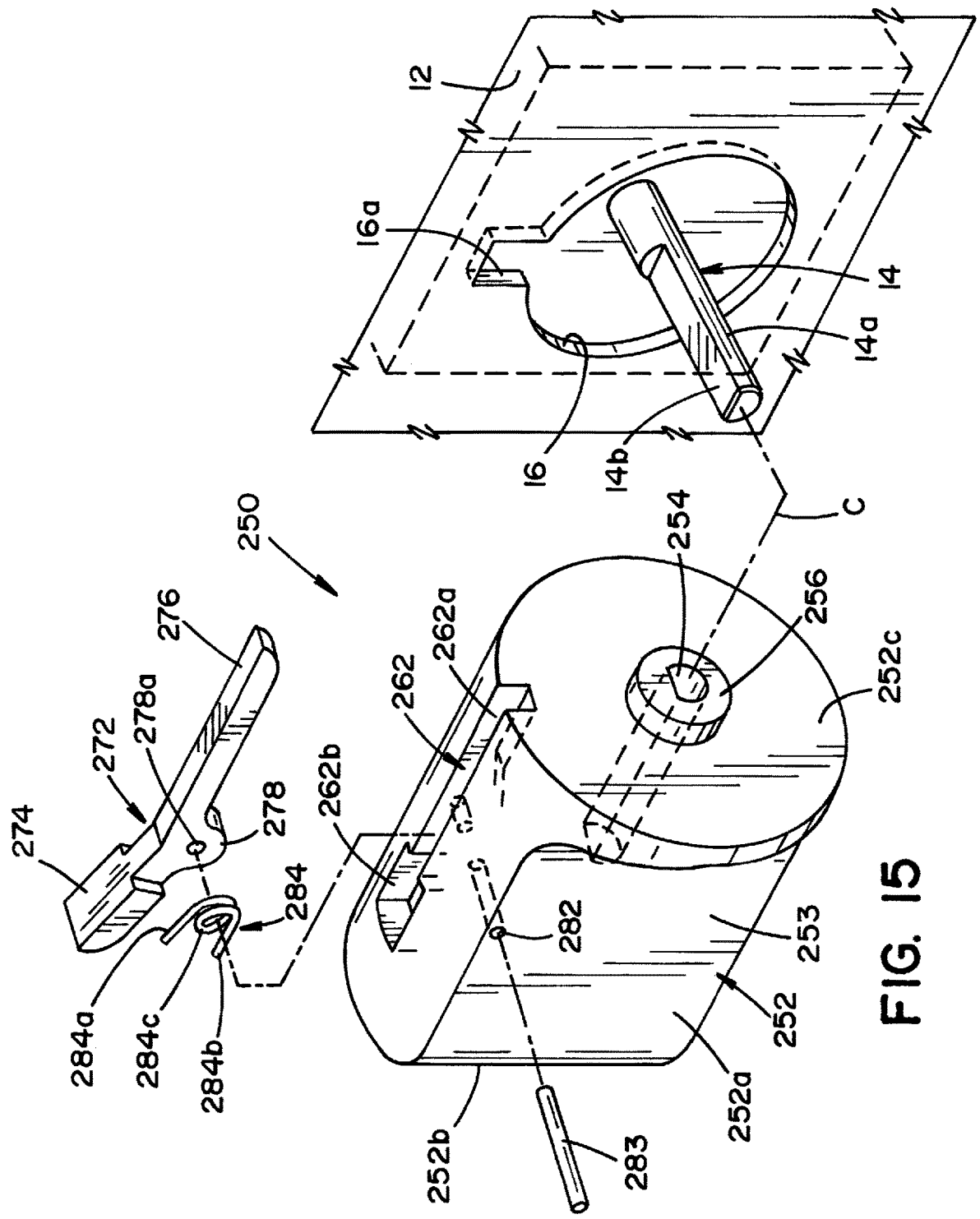
FIG. 15 is an exploded view of the third embodiment shown in FIG. 11.

An opening 254, best seen in FIG. 15, extends into the rear face 252c of the body 252. The opening 254 is axially aligned with the longitudinal axis "C." In the embodiment shown, the opening 254 is "D-shaped" to correspond to the shape of the distal portion 14a of the rod 14. A boss 256 extends from the rear face 252c and the opening 254 extends through the boss 256.

A slot 262 is provided in an outer cylindrical surface of the body 252 from the rear face 252c to a location approaching the front face 252b. The slot 262 extends in a direction generally parallel to the longitudinal axis "C." In the embodiment shown, the slot 262 includes a narrow first portion 262a and a wider second portion 262b. A bottom of the slot 262 includes a recess 262c (best seen in FIGS. 13 and 14) that is dimensioned as described in detail below. The slot 262 is dimensioned to receive the locking element 272

Referring now to FIG. 15, the locking element 272 is best seen. The locking element 172 includes a pressing portion 274 and a lever portion 276. The pressing portion 274 is disposed at an end of the locking element 272 and includes a generally rectangular-shaped portion. The lever portion 276 extends from the pressing portion 274. The pressing portion 274 and the lever portion 276 are formed such that an angle between an upper surface of the pressing portion 274 and an upper surface of the lever portion 276 is less than 180°. A curved tab 278 extends from a lower surface of the locking element 272 at the location where the pressing portion 274 and the lever portion 276 meet. A hole 278a extends through the tab 278 from one side of the locking element 272 to an opposite side of the locking element 272.

A hole 282 also extends laterally through the grip 252a of the body 252. The hole 282 is aligned with the recess 262c of the slot 262 and is dimensioned to receive a pin 283 therein for securement of the locking element 272.

A biasing element 284 is positioned within the slot 262. The biasing element 284 can be a conventional torsional spring having a predetermined spring constant, and having a first leg 284a, a second leg 284b and a coil portion 284c. It is also contemplated that biasing element 284 may be a compression spring 285 (FIG. 13A) that is placed between pressing portion 274 and a bottom of the slot 262.

The control knob 250 is assembled by placing the locking element 272 and the biasing element 284 into the slot 262. The pressing portion 274 is received in the second portion 262b of the slot 262 and the lever portion 276 is received in the first portion 262a of the slot 262. The biasing element 284 is placed to one side of the locking element 272 such that the first leg 284a of the biasing element 284 engages a bottom of the pressing portion 274 and the second leg 284b of the biasing element 284 engages a bottom of the slot 262. The biasing element 284 and the locking element 272 are positioned such that the coil portion 284c of the biasing element 284 and the hole 278a in the locking element 272 align with the hole 282 in the body 252. The pin 283 is then inserted into the hole 278a and through the coil portion 284c and the hole 278a in the locking element 272.

Figure 11:
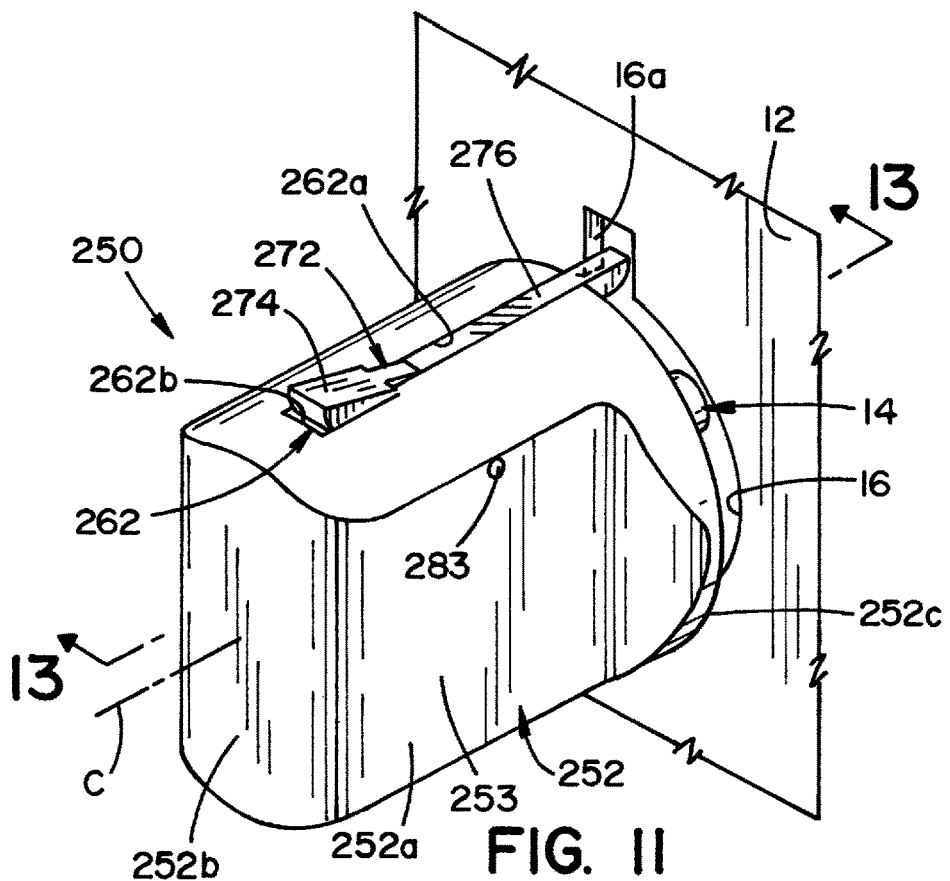
FIG. 11 is a perspective view showing a control knob in an OFF position and a locking element of the control knob in a first position, according to a third embodiment.
Figure 12:
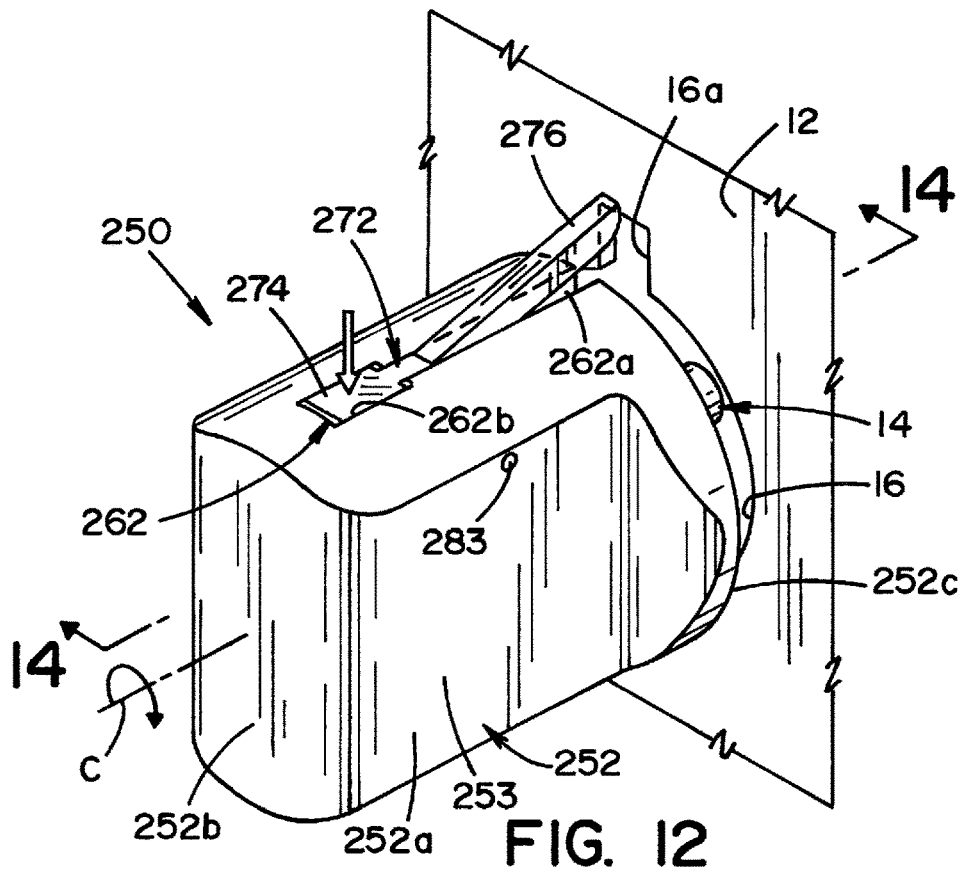
FIG. 12 is a perspective view of the third embodiment shown in FIG. 11, showing the locking element in a second position.
Figure 13:
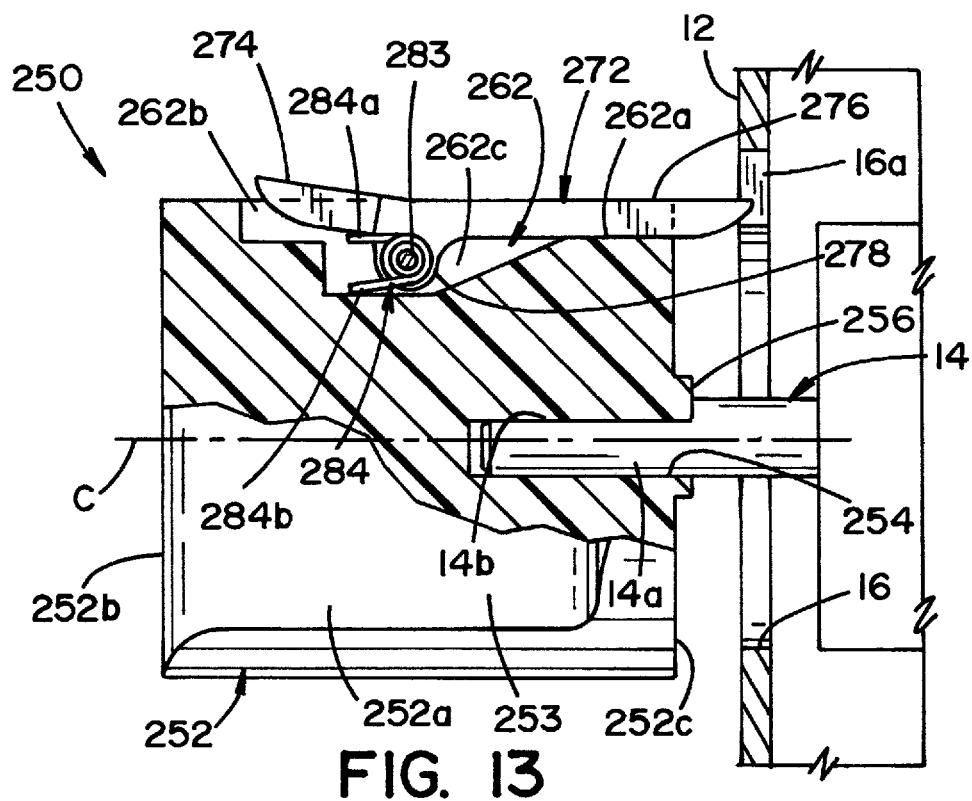
FIG. 13 is a sectional view of the third embodiment shown in FIG. 11 taken along line 13-13.
Figure 14:
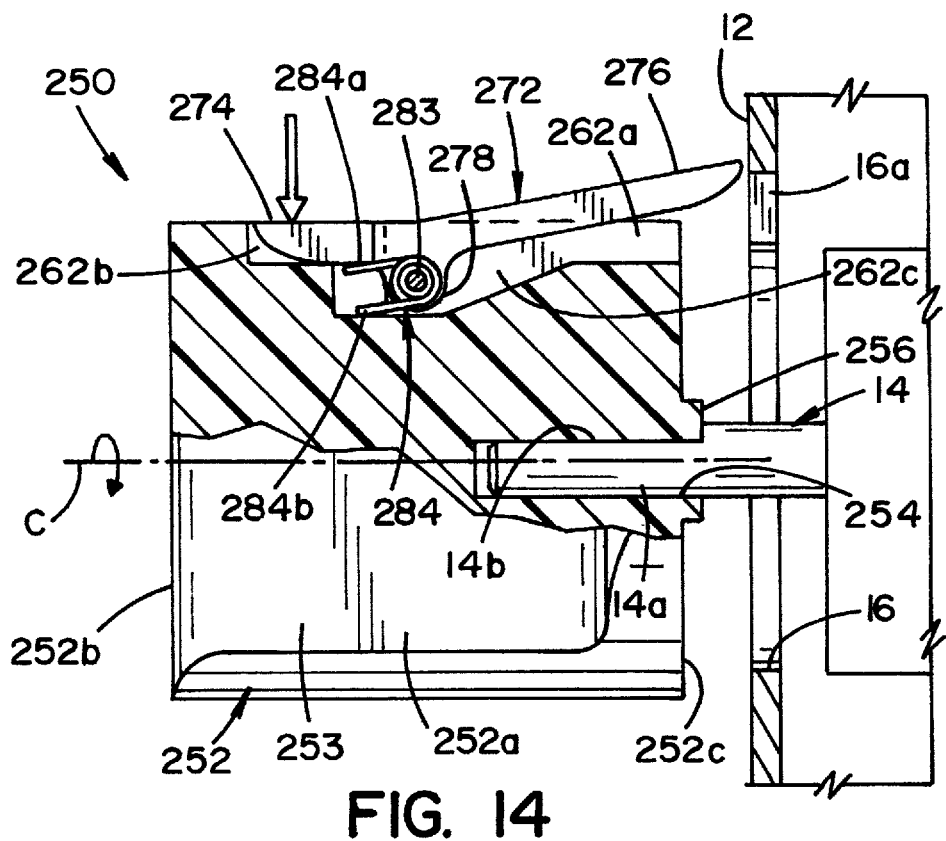
FIG. 14 is a sectional view of the third embodiment shown in FIG. 12 taken along line 14-14.
Figure 13A:
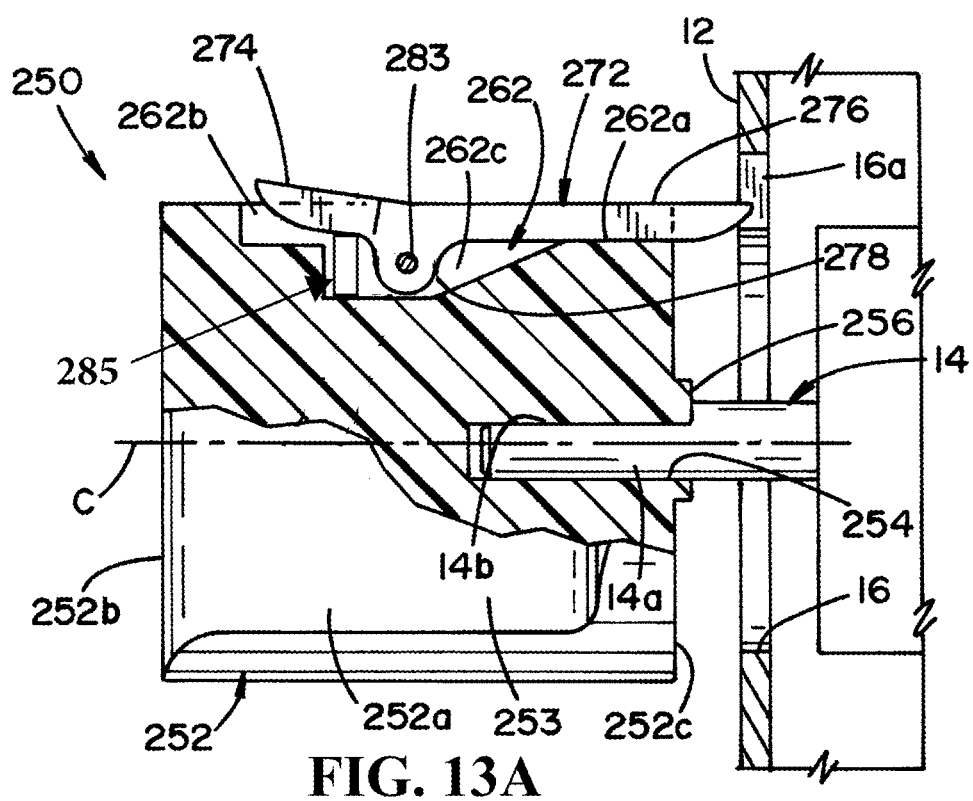
FIG. 13A is a sectional view of the third embodiment shown in FIG. 13, showing a compression spring.

The locking element 272 is moveable between a first, forward position, shown in FIGS. 11 and 13 and a second, retracted position, shown in FIGS. 12 and 14. When the locking element 272 is in the first position, the biasing element 284 applies an upwardly directed force to the bottom of the pressing portion 274 to bias the lever portion 276 against the bottom surface of the slot 262 based on the angle between the pressing portion 274 and the lever portion 276. In this first position, the pressing portion 274 is positioned slightly proud of the outer surface of the body 252 and the distal end of the lever portion 276 is spaced a predetermined distance from the front end of the control knob 250. When the locking element 272 is in the second position, the pressing portion 274 is depressed so that it is at least partially recessed within the second portion 262b of the slot 262, while the lever portion 276 becomes displaced from the first portion 262a of the slot 262 to be positioned slightly proud of the outer surface of the body 252 via pivoting of the locking element 272 about the pin 283. In this second position, the distal end of the lever portion 276 is withdrawn from the first, forward position toward the front end of the control knob 250.

Referring again to FIG. 15, the attachment of the control knob 250 to the distal portion 14a of the rod 14 on the panel 12 is shown. As noted above, the front end of the control knob 250 is oriented toward a user and the rear end of the control knob 250 is oriented toward the appliance. In particular, the opening 254 of the body 252 is dimensioned to receive the distal portion 14a of the rod 14 such that when a user rotates the body 252, the rod 14 will also rotate. It is contemplated that other attachment means, such as, but not limited to, screws, set screws, threads, interference fits, knurled surfaces, etc., may be used alone or in combination to secure the control knob 250 to the rod 14. It is also contemplated that the rear end of the control knob 250 may extend into or through the opening 16 in the panel 12.

The control knob 250 will now be described with reference to the operation of the control knob 250. FIGS. 11 and 13 show the control knob 250 in a first rotational position, hereinafter referred to as an OFF position. When the control knob 250 is in the OFF position, the locking element 272 is in the first, forward position such that the distal end of the lever portion 276 extends into the notch 16a in the panel 12. To turn the control knob 250 to another position besides the OFF position, a user first moves the locking element 272 to the second, retracted position by depressing the pressing portion 274. As the locking element 272 pivots, the lever portion 276 is withdrawn from the notch 16a in the panel 12, as shown in FIGS. 12 and 14, thus being removed as an impediment to rotation of the knob 250 from the OFF position. Once the lever portion 276 is withdrawn from the notch 16a, the user may rotate the control knob 250 to a desired position to control the operation of the related component.

The biasing element 284 continues to bias the lever portion 276 of the locking element 272 toward the panel 12 such that its distal end slides along a circular arc on the surface of the panel 12 as the knob 250 turns. Once the body 252 is rotated back to the OFF position, the locking element 272 realigns with the notch 16a and the biasing element 284 forces the distal end of the lever portion 276 back into the notch 16a, i.e., forces the locking element 272 back into the first position. As such, the control knob 250 is re-secured or locked into the OFF position.

The control knobs 50, 150, 250 described herein each provides a control knob with a safe lockout feature wherein a user must manipulate a locking element to move the control knob from the OFF position. In particular, the user must possess a minimum level of dexterity to actuate the locking element of the control knob while simultaneously turning (and optionally pushing) the control knob from the OFF position.

Illustrative embodiments have been described, hereinabove. It will be apparent to those skilled in the art that the above apparatuses and methods may incorporate changes and modifications without departing from the scope of this disclosure. The invention is therefore not limited to particular details of this disclosure except to the extent that the following claims are necessarily so limited.

What is claimed is:

1. A control knob comprising:
 a rotatable knob body having a longitudinal axis,
 a locking element comprising a lever portion extending therefrom, said lever portion extending in a generally longitudinal direction and being pivotable about an axis extending in a direction generally perpendicular to said longitudinal axis of said knob body, and
 a spring biasing said locking element into a first position wherein a distal end of said lever portion extends to a forward position relative to said knob body, said distal end dimensioned to engage a notch in an appliance to lock said control knob in a predetermined rotational position when said locking element is in said first position, said lever portion being generally coplanar with an outer surface of said knob body in said first position and pivotable against a biasing force of said spring into a second position wherein said distal end of said lever portion is withdrawn from said forward position.

2. The control knob of claim 1, said spring being a torsional spring.

3. The control knob of claim 1, said forward position being spaced from a rear end of said knob body.

4. The control knob of claim 1, said locking element further comprising a pressing portion, said pressing portion being disposed and accessible adjacent the outer surface of said knob body, such that movement of said pressing portion correspondingly pivots said lever portion into said second position against said biasing force.

5. The control knob of claim 4, said pressing portion projecting from said outer surface of said knob body when said locking element is in said first position.

6. The control knob of claim 4, said spring being a compression spring disposed between said pressing portion and said outer surface of said knob body.

7. The control knob of claim 4, said pressing portion pivotable about said axis.

8. The control knob of claim 4, a pin extending into said knob body defining said axis.

9. The control knob of claim 1, wherein:
 said locking element comprises a pressing portion configured to be directly touched by a user,
 said forward position of said locking element relative to said knob body being disposed along the longitudinal axis of the knob body, said second position of said locking body being recessed from said forward position along the longitudinal axis of said knob body, and said pressing portion being generally coplanar with said outer surface of said rotatable knob body when said locking element is in the second position.

10. The control knob of claim 9, said pressing portion being disposed and accessible adjacent the outer surface of said knob body, such that movement of said pressing portion correspondingly pivots said lever portion into said second position against said biasing force.

11. The control knob of claim 9, said pressing portion projecting from said outer surface of said knob body when said locking element is in said first position.

12. The control knob of claim 9, said forward position being spaced from a rear end of said knob body.

13. A control knob for controlling the operation of a component of a household appliance, said control knob comprising:
 a body configured to be attached to a rotatable rod extending from said appliance, and
 a locking element for reversibly securing said body in at least one rotational position, said locking element movable between a first position and a second position, said locking element being configured to engage with a notch in said appliance to rotatably secure said body in said at least one rotational position when said locking element is in said first position, and to disengage from said notch to permit said body to be rotated when said locking element is in said second position,
 said locking element comprising:
 a lever portion pivotable relative to said body, said lever portion having a distal end dimensioned to engage said notch in said appliance when said body is in said at least one rotational position and said locking element is in said first position, said lever portion generally coplanar with an outer surface of said knob body when said locking element is in said first position.

14. The control knob of claim 13, said locking element being pivotable about an axis generally perpendicular to a longitudinal axis of said body.

15. The control knob of claim 13, said distal end of said locking element being dimensioned to slide along a surface of said appliance as said body rotates.

16. The control knob of claim 15, said surface of said appliance being generally perpendicular to a longitudinal axis of said rotatable rod.

\* \* \* \* \*